Dec. 12, 1933.  E. R. FISH  1,938,824
TRANSMISSION GEARING
Filed Aug. 12, 1931
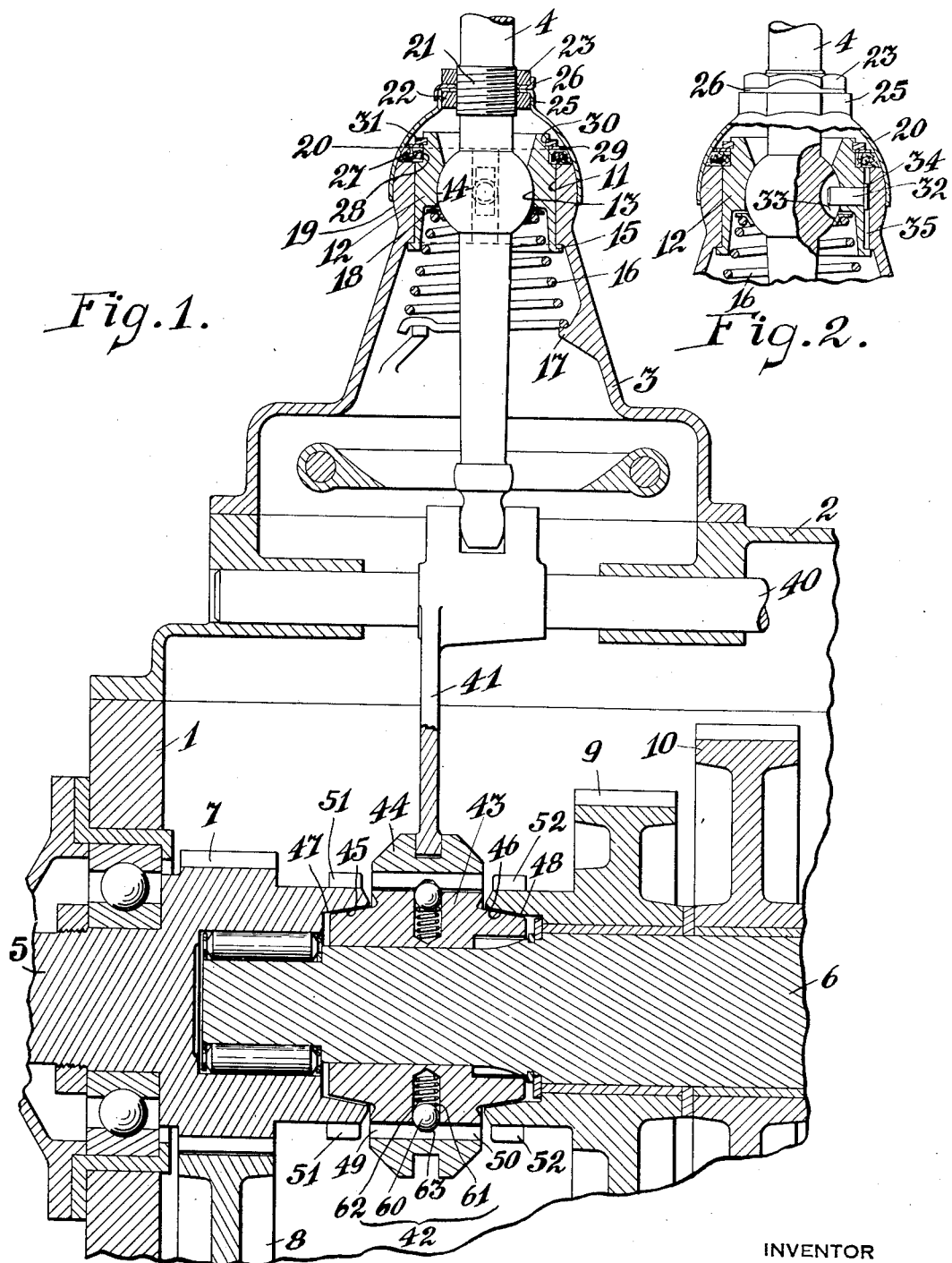
INVENTOR
*Earl R. Fish*,
BY *Bodell & Thompson*
ATTORNEYS.

Patented Dec. 12, 1933

1,938,824

UNITED STATES PATENT OFFICE 1,938,824

TRANSMISSION GEARING

Earl R. Fish, Syracuse, N. Y., assignor to W. C. Lipe Inc., Syracuse, N. Y., a corporation of New York Application August 12, 1931. Serial No. 556,626

7 Claims. (Cl. 74—39)

This invention relates to transmission gearing and has for its object a particularly simple and efficient oil tight mounting for the selecting and gear shifting lever and a particularly simple and efficient shiftable clutch element, consisting of two sections, shiftable as a unit to, first, frictionally engage the clutch element with the friction face of another clutch element of the gearing and thereafter to shift one section axially of the other to engage a toothed clutch face of the shiftable clutch element with a toothed face of the other element, whereby synchronizing of the two elements to be engaged is effected before the toothed clutch faces are brought into engagement.

This invention consists in the novel features and in the combinations and constructions hereinafter set forth and claimed.

In describing this invention, reference is had to the accompanying drawing in which like characters designate corresponding parts in all the views.

Figure 1 is a fragmentary vertical sectional view through the transmission gearing and the tower support, the selecting and shifting lever.

Figure 2 is a fragmentary sectional view of the upper end of the tower taken at a right angle to Figure 1.

1 designates the gear box, 2 a cover therefor, and 3 the support for the selecting and gear shifting lever 4. This support is usually called a tower. The gearing is of the type in which shiftable elements, some of which are clutches are shifted to effect different gear changes, and it includes the usual driving shaft 5, transmission shaft 6 mounted in the gear box in axial alignment, the usual countershaft, not shown, and the gears between the driving shaft and countershaft, and between the countershaft and the transmission shaft. 7 designates a gear on the drive shaft 5, which meshes with the gear 8 on the countershaft. 9 and 10 are gears on the transmission shaft 6 which also coact with gears not shown on the countershaft.

The driving and driven shafts, 5 and 6, are connected directly together in direct driving relation by a clutch means, to be presently described, and also the gear 9 is connected to the shaft 6 to rotate therewith through said clutch means.

The construction thus far described, per se forms no part of the invention. This invention relates to mounting of the gear shifting lever, and the construction of the shiftable clutch element.

The mounting or assembly of the gear shifting lever in the tower 3 will now be described: 11 is a passage formed in the upper end of the tower. 12 is a sleeve mounted in said passage and formed with a ball socket 13. 14 is a ball mounted on, and usually formed integral with the lever, the ball being located in said socket. The lower end of the socket is of larger diameter than the ball in order to permit the ball to be assembled in the socket through the lower end of the socket. The sleeve 12 is also located in the passage 11 by an upward movement relatively to the tower. The sleeve 12 and passage 11 are preferably cylindrical and means is provided for limiting the upward movement of the sleeve 12 in the passage 11; this means being here shown as an external shoulder 15, at the lower end of the sleeve which coacts with the complemental internal shoulder on the wall of the tower. The ball 14 is held in the socket and the sleeve thrust upwardly, by a spring 16, encircling the lower end of the lever 4, and thrusting against internal lugs 17, formed on the tower and against a spring abutment 18, thrusting against the ball below the socket, this abutment being preferably formed with a spherical zone and fitting the ball.

The tower is formed with its upper end spherical at 19, and an adjustable socket or shield 20 is carried by the lever, and coacts with the spherical portion 19, the socket 20 having a hub which is adjustably connected to the lever 4, in order to locate the socket 20, so that it snugly fits the ball portion 19 of the tower, or the oil seal ring to be described. As here illustrated, the lever 4 is threaded at 21, and nuts 22 and 23 thread on the lever 4 against lower and upper sides of the hub 25 of the socket. The lower nut 22 fits into an hexagonal recess in the hub, and the upper nut 23 threads against the lock washer 26, interposed between nut 23 and the upper side of the hub 25.

In order to form an oil seal between the sleeve, the tower, and the socket 20, a packing ring 27 is carried by the sleeve, and overlies the upper edge of the tower and coacts with the inner surface of the socket 20, the inner margin of the ring being located in a recess 28 in the upper portion of the sleeve 12, which portion projects beyond the end of the tower, and this packing ring is held in position by a washer 29 bearing against the upper face of the ring. The washer is held in position by a snap ring 31 in a recess 30, located above the recess 28.

The lever 4 is held from turning movement relatively to the sleeve by means here shown as a pin 32 extending through one side of the sleeve 12, into a notch 33 in the ball 14 and, as the sleeve 12 is circular or cylindrical, and hence liable to turn in the passage 11. The pin is also utilized to hold the sleeve from turning, the pin being provided with a head 34 at its outer end located in a lengthwise groove 35 in the wall of the passage 11.
In assembling, the ball, or knob, not shown, located at the upper end of the lever 4 is assumed to be removed. The sleeve 12 is slid on the lever downwardly until the socket receives the ball 14, and then the lever with the sleeve 12 thereon placed in the tower. The tower is mounted on the cover 2 of the gear box, it being understood that the pin 32 is placed in the sleeve 12 before the lever with the sleeve thereon is mounted in the tower, and that when the lever and the sleeve are placed in the tower, the head 34 of the pin is slid into the groove 35. The spring abutment 18 and spring 16 are then assembled in position in the tower, and finally, the packing ring 27, washer 29, and snap ring 31 are placed in position. The lower nut 22 is then placed on the lever over the upper end thereof and the socket 20 placed on the levers over the upper end thereof against the nut, and the nut is manipulated until it is in such position that the socket 20 coacts most efficiently with the ball portion 19 at the upper end of the tower. The lock washer 26 and lock nut 23 are then placed into position over the upper end of the lever 4. This mounting for the gear shifting lever is oil tight, this being a particular advantage in large heavy duty transmission gears. Also this mounting is particularly simple and economical in construction and easily assembled in the tower.
The gear shifting lever, as will be understood by those skilled in the art, coacts with shift rods as the rod 40, having forks, as 41, which coact with shiftable elements, as gears or clutches. The shiftable element here shown is double shiftable clutch 42, including two sections, one of which is provided with friction faces, and the other with toothed faces, the friction and toothed faces coacting respectively with complemental friction and toothed faces on other elements of the gearing. As here illustrated, the shiftable clutch element comprises an inner section 43 and an outer section 44, the inner section being mounted on and keyed to the transmission shaft 6, and shiftable axially thereof and having friction faces, as conical faces 45 and 46, for coacting with complemental faces 47 and 48 on other elements of the gearing, as the gear 7 and the gear 9, and the outer section 44, is slidably mounted on inner section 43 and is provided with toothed faces 49 and 50, and coacting with complemental toothed faces 51 and 52 on the elements or gears 7 and 9, respectively. The friction faces 45 and 46 are arranged to engage the complemental faces 47 and 48, in advance of the toothed faces 49 and 50 with the toothed faces 51 and 52, in order to synchronize the rotation of the two parts 42 and 7, or 42 and 9, before the toothed faces are brought into engagement. Although the member 42 is shown as a double construction, insofar as this invention is concerned, it may be a single construction.
Means are provided for impositively locking the sections 43 and 44 together, in order that they may be shifted as a unit, when shifted from one direction or another to neutral until the friction faces are engaged and thereafter, the outer section 44 shifted relatively to the inner section 43 to engage the toothed faces, and in
so doing, release the friction faces from further pressure. This impositive locking means is here shown as a spring pressed poppet carried by one of the sections and coacting with a notch in the other section, the poppet being movable at an angle to the shifting movement, and preferably at a right angle, or radially of the sections. As here illustrated, the poppet is carried by the inner section 43 and coacts with a notch in the inner wall of the outer section 44, which wall slidably engages the periphery of the inner section.
60 designates the poppet which is preferably a ball located in a radial passage 61, in the inner section 43 and pressed outwardly by a spring 62 in said passage 61, the ball coacting with a notch 63, which is formed with inclined sides. Usually the teeth of the outer section are internal teeth and extend from end to end or entirely through the outer section and the end portions of these teeth only coact with the teeth 50 and 51 of the elements or gears 7 and 9, respectively, and the notch 63 is formed in this toothed face of the outer section. There are preferably a plurality of such spring pressed poppets. The shiftable element 42 is shifted as a unit by means of the fork 41, coacting with the outer section 44.
In operation, assuming that the shiftable element 42 is in neutral position, the shifting of the fork 41 in one direction or to the other, say to the left, Figure 1, causes the sections 43 and 44 to shift as a unit due to the locking action of the spring pressed poppets. When, however, the shifting movement is restrained by reason of the engagement of the friction clutch faces, 45 and 47, the sliding force applied to the outer section 44, causes the poppets to be displaced inwardly, this being facilitated by the inclined, or cam faces of the notches, freeing or almost entirely freeing the inner section 43 of the sliding force, so that the outer section now shifts lengthwise of the inner section and engages the outer teeth 49 and 51, the rotation of the two parts 7 and 42 having been synchronized by reason of the engagement of the friction faces 45 and 47. To release the toothed faces 49 and 51, the fork 41 is shifted in the opposite direction, or to the right, to neutral position, and in so doing, first shifts the outer section 44 to the right relatively to the inner section 43, until the poppets again snap into the notches, this occurring before the element 42 reaches neutral position, and then during the continued movement to neutral position, the outer sections 43, and 44 shifting as a unit. The shifting of the unit 42 to the right engages the friction faces 46 and 48, and the toothed faces 50 and 52 in exactly the same manner.
This clutch element 42, with the synchronizing action is particularly simple and economical in construction and also particularly advantageous in that the friction sections are released of pressure after they have performed their synchronizing action and after the toothed faces are engaged, are not under spring pressure.

What I claim is:

1. In a transmission gearing, a selecting and shifting lever and a mounting therefor, comprising a tower having a sleeve passage opening through its upper end, a sleeve mounted in the passage and formed with a ball socket, a ball on the lever in said socket, the lower end of the socket being of larger diameter than the ball and a spring in the tower and thrusting against the ball to hold the ball in the socket and the sleeve in said passage, the sleeve and the tower having coacting shoulders for limiting the movement of the sleeve upwardly in the passage.

2. In a transmission gearing, a selecting and shifting lever and a mounting therefor, comprising a hollow tower having a passage for a sleeve at its upper end, a sleeve mounted in the passage and formed with a ball socket, a ball on the lever in said socket, the lower end of the socket being of larger diameter than the ball, a spring abutment thrusting against the ball below the socket and a spring in the tower thrusting against the abutment, the sleeve having a shoulder coacting with the wall of the tower for limiting the upward movement of the sleeve in the passage.

3. In a transmission gearing, a selecting and shifting lever and a mounting therefor, comprising a hollow tower having a passage for a sleeve at its upper end, a sleeve mounted in the passage and formed with a ball socket, a ball on the lever in said socket, the lower end of the socket being of a larger diameter than the ball, a spring abutment thrusting against the ball below the socket and a spring in the tower thrusting against the ball below the socket, the sleeve being assembled in the passage through the lower end of the tower and the sleeve and the tower having coacting means for limiting the upward movement of the sleeve in the passage.

4. In a transmission gearing, a selecting and shifting lever and a mounting therefor, comprising a tower having a sleeve passage opening through its upper end, a sleeve in the passage and formed with a ball socket, a ball on the lever in said socket, the ball being formed with a recess in one side thereof and the wall of said passage being formed with a lengthwise groove and a pin extending transversely through the wall of the sleeve and having its inner end in said recess, and its outer end in said groove.

5. In a transmission gearing, a selecting and shifting lever and a mounting therefor, comprising a tower having a sleeve passage opening through its upper end, a sleeve in the passage and formed with a ball socket, a ball on the lever in said socket, the ball being formed with a recess in one side thereof and the wall of said passage being formed with a lengthwise groove and a pin extending transversely through the wall of the sleeve and having its inner end in said recess and its outer end in said groove, the lower end of the socket of the sleeve being of larger diameter than the ball, the spring abutment thrusting against the ball below the socket and a spring in the tower thrusting against the abutment, the sleeve and the tower having coacting means for limiting the upward movement of the sleeve by the thrust of the spring against the ball.

6. In a transmission gearing, a selecting and shifting lever, and a mounting therefor, comprising a tower having a sleeve passage opening through its upper end, a sleeve mounted in the passage the sleeve projecting about the upper end of the tower, the lever being mounted in the sleeve, to have a selecting and shifting movement, means tending to thrust the lever and sleeve upward, means coacting with the sleeve for limiting the upward movement of the sleeve in the passage, the upper end portion of the tower being spherical and a socket carried by the lever and closing the spherical upper end portion, an oil seal, comprising a packing ring carried by the portion of the sleeve projecting above the upper end of the tower and overlapping the upper edge of the tower and coacting with the inner face of said socket, and means for clamping the ring in position.

7. In a transmission gearing, a selecting and shifting lever, and mounting therefor, comprising a tower having a sleeve passage opening through its upper end, a sleeve mounted in the passage, the lever being mounted in the sleeve to have a selecting and shifting movement, means tending to thrust the lever and sleeve upward and means for limiting the upward movement of the sleeve in the passage, the upper end portion of the tower being spherical, a socket carried by the lever and closing the spherical upper end, an oil seal comprising a packing ring carried by the sleeve and overlapping the upper edge of the tower and coacting with the inner face of said socket, and means for clamping the sealing ring in position on the upper end of the sleeve and overlying the sealing ring and a snap ring at the upper end of the sleeve and overlying the washer.

EARL R. FISH.